United States Patent [19]

Takahashi

[11] Patent Number: 5,112,422
[45] Date of Patent: May 12, 1992

[54] METHOD OF MANUFACTURING CARBON FIBRE-REINFORCED CARBON ELONGATED STRUCTURAL COMPONENTS

[75] Inventor: Susumu Takahashi, Yokohama, Japan

[73] Assignee: Kanto Yakin Kogyo K.K., Japan

[21] Appl. No.: 640,877

[22] Filed: Jan. 14, 1991

[30] Foreign Application Priority Data

Jan. 19, 1990 [JP] Japan .................................. 2-9910

[51] Int. Cl.⁵ ..................... B65H 81/06; B65H 81/00; C01B 31/00
[52] U.S. Cl. ..................................... 156/175; 52/729; 156/173; 156/182; 156/250; 264/29.1; 264/29.5
[58] Field of Search .................. 156/173, 175, 174, 89, 156/172, 182, 250, 189, 191, 192; 264/29.1, 29.5, 29.7; 423/449; 52/729

[56] References Cited

U.S. PATENT DOCUMENTS 3,367,812  2/1968  Watts ............................. 156/173 X
3,917,884  11/1975  Jahn ............................. 264/29.7 X
4,020,202  4/1977  Kreft ............................. 428/373 X

FOREIGN PATENT DOCUMENTS 85957  10/1958  Denmark ............................ 156/174
2197618  5/1988  United Kingdom ................. 428/118

*Primary Examiner*—Michael W. Ball
*Assistant Examiner*—Adrienne C. Johnstone
*Attorney, Agent, or Firm*—Shlesinger, Fitzsimmons & Shlesinger

[57] ABSTRACT

Elongated structural components having a cross-section such as of a letter of H, U, or T and made of carbon fibre-reinforced carbon are manufactured without employing specific dies correspondent to the aforementioned cross-section. A plurality of square tubes prepared simply by winding carbon fibres over a square mandrel and impregnating with adhesives, are bundled to a single block, wound with aramid fibres, and subjected to heating for the carbonization of the adhesives and consequently of said block of tubes. The carbonized block is cut along its longitudinal axes into a number of elongated pieces having the desired cross-section.

2 Claims, 1 Drawing Sheet

METHOD OF MANUFACTURING CARBON FIBRE-REINFORCED CARBON ELONGATED STRUCTURAL COMPONENTS

BACKGROUND OF THE INVENTION

This invention relates to a method of manufacturing structural parts or components used under a high temperature, such as those in a form of structural frames for supporting heat-insulation materials within a high temperature atmosphere heating furnace, in a form of platforms for mounting thereupon articles to be heat-treated, and in a form of rails for guiding articles to be heat-treated. More particularly, this invention relates to a method of manufacturing such structural components or parts by carbon fibre-reinforced carbon, which are to be used within a furnace, the heating temperature of which exceeds a maximum heat-resistant temperature of conventional heat-resistant materials such as alumina and the like.

In a heating furnace, the working temperature of which is higher than 1,800° C., its heating elements, heat-resistant components, heat-insulation components, devices for supporting or conveying articles in the furnace, and the like are made of highly heat-resistant materials. However, when structural components are to be used within a heating furnace of a working temperature of 2,000° C. to 3,000° C., they can not be made of metals or ceramics. They are, therefore, mostly made of carbon materials.

For example, heating elements are, in such instance, made from graphite plates or bars. Their structural components are also generally made from graphite sheets. Heat-insulation components are made of granules, powders, or fibres of carbon or graphite. Although materials made by sintering graphite powders and the like have been widely employed to compose structural parts, recently developed carbon fibre-reinforced carbons having strength extremely higher than graphites now take the place of the latter.

However, it is very difficult to prepare structural components of a desired configuration such as H-shaped, T-shaped, and so on by means of carbon fibre-reinforced carbons. That is, when carbon fibers or fabrics which have been applied with adhesives, are baked within a die or mould, they will not be afforded with a sufficiently high strength unless the mould is subjected to and kept under a high pressure. In order to bake the carbons, it is required to place the mould loaded with the carbons into a high temperature furnace, while the mould brought into the furnace has to be kept under a high pressure. These two requirements make manufacturing operations very difficult and furnace structures very complicated. Especially when elongated structural components are to be manufactured, furnace installations become further complicated and expensive.

BRIEF SUMMARY OF THE INVENTION

In view of the above, this invention is to provide a method for manufacturing easily and at a reasonable cost elongated or lengthy structural components made of carbon fibre-reinforced carbons.

In the method made in accordance with this invention, carbon fibres are wound up around a mandril to obtain a tubular body, and are then impregnated by adhesives. Carbon fibres thus wound up are in turn wound up tightly by fibers such as aramid fibres having a negative coefficient of linear expansion. And, then a plurality of such square tubular or hollow bodies are arranged in parallel and are bound to each other by adhesives at their sides. Thereafter, they are heated to make the adhesives carbonized and cured, so that they are shaped to form block or train of bodies as if it were made by exerting on it pressures circumferentially by dies or moulds. Then, they are cut along longitudinal directions of the block to produce a plurality of structural components of a desired configuration such as H-shaped or T-shaped at their vertical cross sections.

The method of this invention is further explained below by a preferred embodiment and with reference to the accompanying drawings.

DETAILED DESCRIPTION OF THE INVENTION

Figure 1:
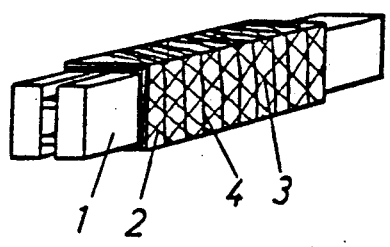
FIG. 1 is an explanatory perspective view showing how to make a single tubular or hollow body in accordance with this invention.
Figure 2:
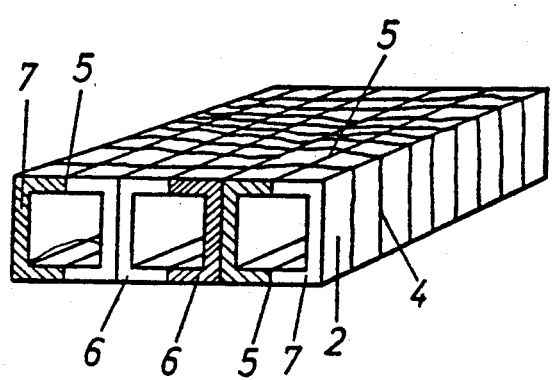
FIG. 2 is a similar explanatory perspective view showing a plurality of tubular bodies which are integrated together into a block and will be cut to structural components of desired configurations.

As shown in FIG. 1, extremely strong carbon fibres 2 of about 7 μm in diameter were wound up over a mandril 1 having a regular square cross-section with each side measuring 30 mm. Windings of fibres were made to a thickness of about 3 mm in such manner that each fibre was inclined to the longitudinal axis of the mandril at about 30 to 45 degrees so that the fibres crossed each other to make numerous cross points 3.

Thermo-hardening phenol resins were impregnated among the fibres, and bundles 4 of aramid fibres were tightly wound up over the fibres 2.

A plurality of (three in this embodiment) square tubes thus made of extremely strong carbon fibres were arranged parallel to each other so that one of the sides of each tube abutted with an adjacent side of another of the tubes. The butting tubes were then tightly tied together by the bundles of aramid fibres.

The block or train of tubes thus produced were heated in a heating furnace of a nitrogen atmosphere by raising the furnace temperature at 100° C. per hour till it reached 600° C., whereby they were stabilized. After removing the square mandril from each tube, they were heated again in a nitrogen atmosphere to 1,000° C., whereby they were carbonized. If desired on account of their purposes of use, they can be heated as high as 2,800° C. for the graphitization thereof. When the heating was made over 2,500° C., an argon atmosphere was employed. As the aramid fibres 4 wound about the carbon fibre tubes, and those wound about the block composed by the tubes, are subject to a shrinkage of about 2% of their length at 40° C., the tubes and block were tightly fastened circumferentially, whereby rigid structures were obtained.

The square and hollow tubes which were made integral into a block, were cut out by a diamond cutter along lines 5, whereby two pieces of H-shaped elongated structural components 6, and two pieces of U-shaped elongated structural components were obtained. By way of cutting the block in a different way, other shaped such as T-shaped structural components are readily obtainable.

An average tensile strength of the structural components thus finally obtained in accordance with this invention was 20 to 25 Kg/mm², while their average bending strength was 25 to 30 Kg/mm².

As explained above, the method of this invention does not require heating installations specifically provided with dies or other pressurizing gears. Accordingly, works related to the method is simple, and elongated structural components of various configurations for use under a high temperature can be produced economically.

I claim:

1. A method of making elongated structural components of a desired cross sectional configuration, which comprises:

preparing each of a plurality of square tubes by winding a large number of carbon fibres around a mandrel, and in such manner that the fibres frequently cross each other;

impregnating the resulting tubes with thermo-hardening adhesives;

arranging the tubes side-by-side and parallel to each other so that their adjacent sides abut each other and so that they form a block;

winding snugly around the block aramid fibres having a negative coefficient of linear expansion;

heating the block so that the aramid fibres shrink to tightly fasten the tubes together and so that the adhesives are carbonized; and cutting the block into a number of pieces which correspond to the structural components of the desired configuration.

2. A method for making elongated structural components as in claim 1, wherein the cross sectional configuration is selected from the group consisting of H-shaped, U-shaped, and T-shaped.

* * * * *